3,170,416
TOASTER COVER AND SERVING TRAY DEVICE
Stephen Gerlich, Chicago, Ill.
(2629 W. 98th St., Evergreen Park, Ill.)
Filed Apr. 3, 1963, Ser. No. 270,277
4 Claims. (Cl. 108—42)

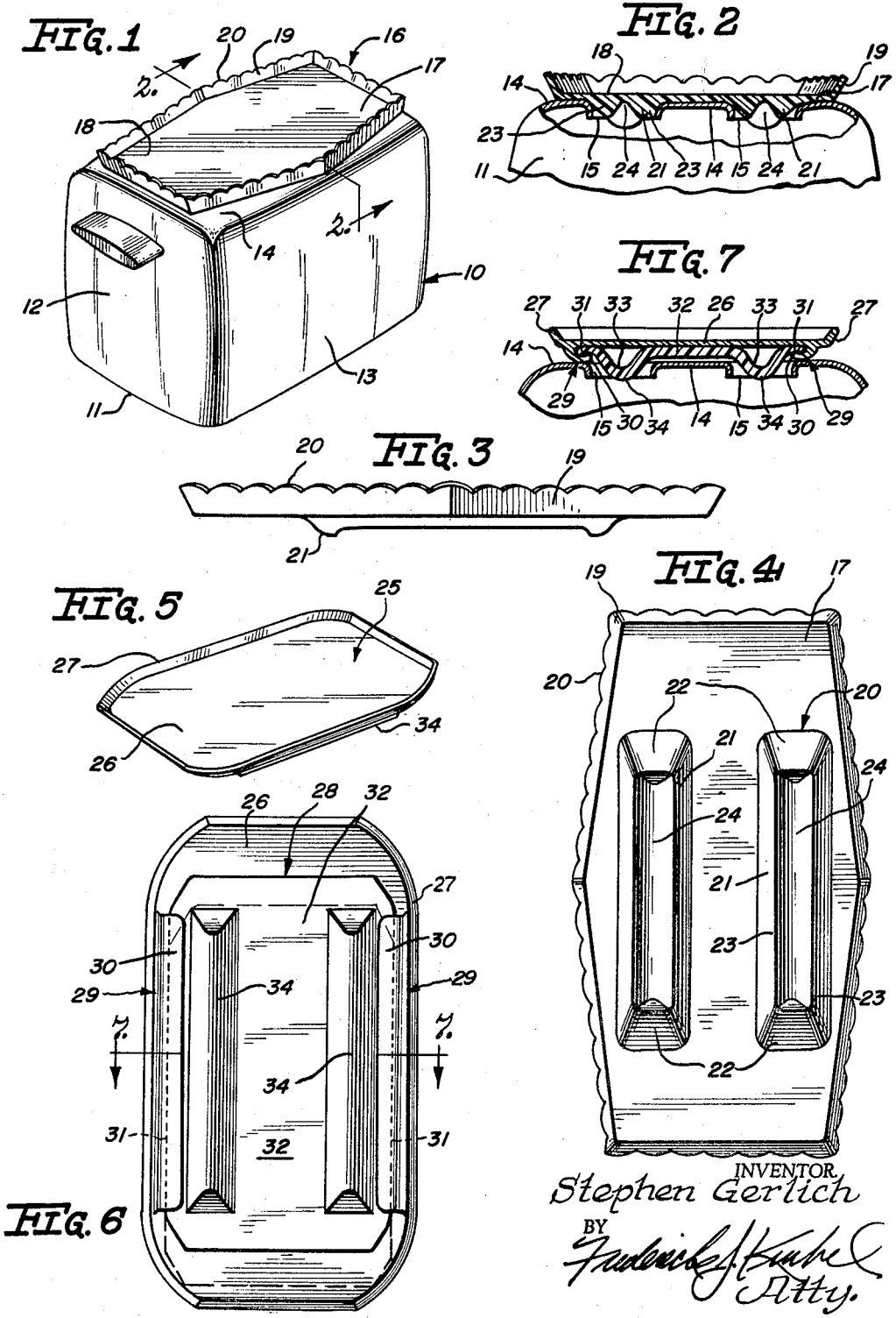

This invention relates to a toaster cover and serving tray device, and more particularly to a novel cover for an electric bread toaster adapted to prevent foreign matter from entering the bread-receiving slots when the toaster is stored and which is adapted to function as a toast serving tray when the toaster is being used.

An important object of the invention is to provide a new and improved combination toaster cover and serving tray device which is simple in design and construction, sturdily built, attractive in appearance, and relatively inexpensive to manufacture.

A further object is to provide a cover for an electric bread toaster of the type having elongated bread-receiving slots formed in the top wall of the outer casing thereof which is positionable on the toaster casing when the toaster is stored and not being used, to close the slots and thereby prevent the entrance of dust and other foreign elements into the interior of the toaster casing which could render the toaster unsanitary and/or possibly damage the toaster heating elements and grids.

A still further object is the provision of a storage cover for a toaster which is adjustable so as to be centered over the toaster regardless of the disposition of the bread-receiving slots with respect to the end walls of the toaster casing and, thus, is capable of being used with a large variety of different make and model toasters.

A still further object of the present invention is the provision of a combination toaster storage cover and serving tray device made of plastic material and having projecting locating means formed thereon which are operatively engageable with the toaster casing wall portions defining the bread-receiving slots to correctly position the device on the toaster casing and prevent accidental dislodgment thereof.

The foregoing and other important objects and desirable features inherent in and encompassed by the invention, together with many of the purposes and uses thereof, will become readily apparent from a reading of the ensuing description in conjunction with the annexed drawing, in which, FIGURE 1 is a perspective view of a new and improved combination toaster cover and serving tray device embodying the invention positioned on an electric bread toaster;

FIGURE 2 is a vertical sectional view taken substantially along line 2—2 of FIGURE 1;

FIGURE 3 is a side elevational view of the combination toaster cover and serving tray device;

FIGURE 4 is a bottom plan view of the device shown in FIGURE 3;

FIGURE 5 is a perspective view of a second embodiment of the invention;

FIGURE 6 is a bottom plan view of the modified version of the combination toaster cover and serving tray illustrated in FIGURE 5; and FIGURE 7 is a sectional view taken substantially along line 7—7 of FIGURE 6.

Referring to the drawing in detail, wherein like reference characters represent like elements throughout the various views, a conventional electric bread toaster 10 is shown. The toaster casing 11 is generally rectangularly shaped in plan with the end walls 12 spaced a greater distance with respect to each other than the side walls 13 are spaced. The top wall 14 of the toaster casing 11 is provided with a pair of transversely spaced, elongated bread-receiving slots 15. It is to be understood that the invention is equally adaptable to bread toasters having more than two bread-receiving slots 15.

As is well known, the interior toasting compartments including the bread supporting grids and heating elements are open to the atmosphere in conventional toasters when the toaster is not being used. Dust, debris and other unwanted foreign matter can easily enter the toaster casing 11 through the bread-receiving slots 15 to render the toaster 10 unsanitary and to possibly cause the toaster 10 to malfunction. As stated hereinbefore, one of the objects of the invention is to provide means or a device which not only effectively seals the interior of the toaster casing 11 from the atmosphere but which, also, is attractive in appearance and will enhance rather than mar the general overall esthetic appeal of the toaster 10. The device 16 of the embodiment of the invention shown in FIGURE 1 includes a plate-like base 17 which is preferably made of plastic material so as to be light weight, inexpensive to manufacture, and readily and easily cleaned when necessary. The top surface 18 of the base 17 is flat and uninterrupted, as best shown in FIGURE 1. The area of the top surface 18 is slightly smaller than the area of the top wall 14 of the toaster casing 11 and, consequently, when the device 16 is placed on the toaster 10, the top wall 14 is substantially covered thereby.

Integrally formed with and extending upwardly and outwardly from the marginal edges of the base 17 is a relatively short, continuous lip or flange 19. The uppermost edge 20 of the lip 19 is scalloped to enhance the decorative appearance of the device 16. The lip 19 is provided to maintain the articles such as pieces of toast or the like on the top surface 18 of the base 17 when the toaster 10 is in operation and the device 16 is being used as a serving tray rather than a cover.

In order to facilitate the proper positioning of the device 16 on the toaster 10 so that the base 17 completely covers the bread-receiving slots 15 and thereby effectively prevents the entrance of dust and other foreign matter into the toaster casing 11 when the toaster 10 is not in use and is in its stored condition and to prevent the device 16 from being accidentally dislodged from the top of the toaster casing 11, locating means, designated generally by reference character 20, are provided. The locating means 20 are in the form of a pair of elongated projections 21 which are preferably integrally formed with and depend from the underside of the base 17, as best shown in FIGURES 2 and 4. Each projection 21 has a length and width substantially coextensive to the length and width, respectively, of a bread-receiving slot 15 and are transversely spaced with respect to each other substantially the same transverse spacing between the bread-receiving slots 15. The outer end surfaces 22 and outer side surfaces 23 of each projection 21 are tapered or inclined to facilitate placement of the device 16 on the toaster 10. It will also be noted that the center section 24 of each projection 21 is hollowed out to reduce the amount of plastic material needed to manufacture the device 16 and thereby reduce its cost.

In the embodiment of the invention, designated generally by reference character 25, and shown in FIGURES 5, 6 and 7 the base 26 while having a contour slightly different from that of the base 17, functions in the same manner as the base 17. That is, the base 26 is adapted to substantially cover the entire top wall 14 of the toaster casing 11 when serving as a toaster storage cover. However, instead of the device 25 being constructed of a single piece, as in the construction of the device 16 it is preferably fabricated from two pieces for a purpose which will be pointed out hereinafter. The marginal edge of the base 26 is also provided with an upstanding lip 27 for maintaining the articles being served on the base 26 when the device 25 is used as a serving tray.

As stated hereinbefore, one of the objects of the invention is to provide a combination toaster storage cover and serving tray device of a single size which is readily adaptable to a wide variety of toaster constructions wherein the spacing of the bread-receiving slots 15 with respect to the end walls 12 of each toaster casing 11 is different from that of the others. This is accomplished by making the locating means, designated generally by reference character 28, longitudinally adjustable with respect to the base 26. The structure incorporated in the device 25 for imparting the adjustability feature thereto includes a pair of longitudinally extending, transversely spaced tracks 29 carried on the underside of the base 26. Each track 29 comprises flange 30 which is integrally formed with and extends transversely inwardly from a respective longitudinal edge of the base 26. The flanges 30 are vertically spaced sufficiently from the underside of the base 26 to accommodate the longitudinal edge portions 31 of the locating means 28 for relative sliding movement. It is to be understood, however, that once an adjustment of the locating means 28 is made the longitudinal edge portions 31 are frictionally gripped between the underside of the base 26 and the flanges 30 sufficiently to prevent inadvertent relative movement between the base 26 and the locating means 28. From the foregoing, it will be appreciated that the locating means 28 is infinitely adjustable with respect to the base 26 between the extreme positions indicated by broken lines in FIGURE 6.

The locating means 28 of the embodiment of the invention shown in FIGURE 5 includes a substantially rectangular plate 32, when viewed in plan, as illustrated in FIGURE 6. The plate 32 is formed with a pair of longitudinally extending, transversely spaced depressions 33 which results in a pair of projections 34 being provided on the underside of the plate 32 when the locating means 28 is assembled on the base 26, as best shown in FIGURE 7. The projections 34 are insertable in the bread-receiving slots 15 in the same manner and for the same purpose as the projections 21 described above.

From the foregoing, it is believed the operation of the embodiment of the invention illustrated in FIGURES 5, 6 and 7 is clear. The plate 32 is first adjusted with respect to the base 26 so that when the base 26 is centered over the top wall 14 of the toaster casing 11 to completely cover the bread-receiving slots 15, the projections 34 are disposed within the bread-receiving slots 15.

The embodiments of the invention chosen for the purposes of illustration and description herein are those preferred for achieving the objects of the invention and developing the utility thereof in the most desirable manner, due regard being had to existing factors of economy, simplicity of design and construction, production methods and the improvements sought to be effected. It will be be appreciated, therefore, that the particular structural and functional aspects emphasized herein, are not intended to exclude, but rather to suggest, such other adaptations and modifications of the invention as fall within the spirit and scope of the invention as defined in the appended claims.

What is claimed is:

1. A combination storage cover and serving tray device for a toaster having a plurality of bread-receiving slots in the top wall of the casing thereof, comprising, a plate-like base mountable on the top wall of the toaster casing, said base having a length greater than its width and an area in plan sufficiently large enough to cover the bread-receiving slots when centered on the top wall of the toaster casing, locating means operatively engageable with the top wall structure defining the bread-receiving slots to substantially prevent relative transverse and longitudinal movement between said locating means and the top wall of the toaster casing when mounted thereon, and adjustable means for connecting said locating means to the normally lowermost side of said base, said adjustable means permitting said base and said locating means to slide longitudinally with respect to each other to a predetermined relative position whereby said base will be centered on the top wall of the toaster casing when said projections are inserted in the bread-receiving slots, said base and locating means being dismountable from the toaster casing and said base being capable of supporting articles thereon so as to be usable as a serving tray for the articles.

2. A combination storage cover and serving tray device for a toaster as set forth in claim 1, wherein said base and locating means are made of plastic material, and further including an integrally formed lip at the peripheral edge of said base extending upwardly from the normally uppermost side of said base.

3. A combination storage cover and serving tray device for a toaster having a plurality of bread-receiving slots in the top wall of the casing thereof, comprising, a plate-like base of plastic material mountable on the top wall of the toaster casing, said base having an area in plan sufficiently large enough to cover the bread-receiving slots when centered on the top wall of the toaster casing, an integrally formed lip at the peripheral edge of said base extending upwardly from the normally uppermost side of said base, locating means of plastic material operatively engageable with the top wall structure defining the bread-receiving slots to substantially prevent relative transverse and longitudinal movement between said locating means and the top wall of the toaster casing when mounted thereon, said locating means including a plate having a plurality of integrally formed, elongated projections depending from the normally lowermost side thereof, each of said projections being insertable in a respective bread-receiving slot, and adjustable means for connecting said plate to the normally lowermost side of said base, said adjustable means permitting said base and plate to slide relatively with respect to each other along the longitudinal axis of said base to a predetermined relative position whereby said base will be centered on the top wall of the toaster casing when said projections are inserted in the bread-receiving slots, said base and plate being dismountable from the toaster casing and the normally uppermost side of said base being relatively flat and capable of supporting articles thereon so as to permit the device to be usable as a serving tray for the articles.

4. A combination storage cover and serving tray device as set forth in claim 3, wherein said adjustable means includes longitudinally extending track means carried on the normally lowermost side of said base, said track means being adapted to receive and frictionally grip longitudinal edge portions of said plate.

References Cited by the Examiner

UNITED STATES PATENTS

| 1,908,988 | 5/33 | Lack | 108—44 |
| 2,487,168 | 11/49 | Mordkin | 220—97 X |
| 2,647,716 | 8/53 | Hudziak et al | 108—47 X |
| 2,693,751 | 11/54 | Allen | 211—181 X |
| 3,070,416 | 12/62 | Post | 108—14 X |

FOREIGN PATENTS 643,301  9/50  Great Britain.

FRANK B. SHERRY, *Primary Examiner*.